United States Patent
Badolato et al.

(10) Patent No.: US 11,396,151 B2
(45) Date of Patent: Jul. 26, 2022

(54) APPARATUS AND PROCESS FOR BUILDING TYRES FOR VEHICLE WHEELS

(71) Applicant: Pirelli Tyre S.p.A., Milan (IT)

(72) Inventors: Luigi Antonio Badolato, Milan (IT); Luigi Bosio, Milan (IT); Dario Giambersio, Milan (IT); Enrico Sabbatani, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 329 days.

(21) Appl. No.: 16/472,360

(22) PCT Filed: Dec. 21, 2017

(86) PCT No.: PCT/IB2017/058258
§ 371 (c)(1),
(2) Date: Jun. 21, 2019

(87) PCT Pub. No.: WO2018/122694
PCT Pub. Date: Jul. 5, 2018

(65) Prior Publication Data
US 2019/0358923 A1    Nov. 28, 2019

(30) Foreign Application Priority Data

Dec. 29, 2016    (IT) .................. 102016000132442

(51) Int. Cl.
*B29D 30/24*     (2006.01)
*B29D 30/32*     (2006.01)
*B29D 30/72*     (2006.01)

(52) U.S. Cl.
CPC ........... *B29D 30/244* (2013.01); *B29D 30/32* (2013.01); *B29D 30/72* (2013.01); *B29D 2030/3264* (2013.01)

(58) Field of Classification Search
CPC .... B29D 2030/3264; B29D 2030/3257; B29D 2030/3221; B29D 2030/325; B29D 2030/2664; B29D 2030/2657; B29D 30/24
(Continued)

(56) References Cited

U.S. PATENT DOCUMENTS 3,887,423 A * 6/1975 Gazuit .................. B29D 30/32
                                                          156/402
6,475,319 B1   11/2002 Akiyama
(Continued)

FOREIGN PATENT DOCUMENTS

DE   10 2011 050142 A1   11/2012
EP      0997263 A2        5/2000
(Continued)

OTHER PUBLICATIONS

ESpaceNet Translation of WO2014198435 (Year: 2021).*
(Continued)

*Primary Examiner* — Robert C Dye
*Assistant Examiner* — Alexander D Booth
(74) *Attorney, Agent, or Firm* — Finnegan, Henderson, Farabow, Garrett & Dunner, L.L.P.

(57) ABSTRACT

The present invention relates to an apparatus and to a process for building tyres for vehicle wheels, wherein sidewalls (11) are applied on opposite sides of a carcass sleeve (12) placed on a shaping drum (13). The application of the sidewalls (11) comprises: arranging each sidewall (11) as a ring around application levers (24) of a respective support (18), making an axial appendage (35) of the sidewall (11) protrude axially beyond the free ends (25) of the respective application levers (24); radially opening the free ends (25) of the application levers (24) of each support (18) so as to make the respective sidewall (11) radially expand; axially
(Continued)

approaching the free ends (25) of the application levers (24) to the respective half-drum (17) up to engaging the axial appendage (35) with the carcass sleeve (12) and radially opening the free ends (25) of the application levers (24) to adhere the sidewalls against the carcass sleeve (12).

14 Claims, 16 Drawing Sheets

(58) Field of Classification Search
USPC ............ 156/130.7, 421, 132, 400, 402, 417
See application file for complete search history.

(56) References Cited

U.S. PATENT DOCUMENTS

| | | | |
|---|---|---|---|
| 2003/0034132 A1* | 2/2003 | De Graaf | B29D 30/32 156/402 |
| 2010/0122775 A1 | 5/2010 | De Graaf et al. | |

FOREIGN PATENT DOCUMENTS

| | | | | |
|---|---|---|---|---|
| EP | 1272338 | | 1/2003 | |
| EP | 2279853 | A1 | 2/2011 | |
| EP | 2380728 | A1 | 10/2011 | |
| EP | 2403710 | A1 | 1/2012 | |
| EP | 2464508 | A1 | 6/2012 | |
| GB | 1273059 | A * | 5/1972 | ......... B29D 30/3014 |
| WO | WO 2009/142482 | A1 | 11/2009 | |
| WO | WO 2012/147012 | A1 | 11/2012 | |
| WO | WO 2014/198435 | A1 | 12/2014 | |
| WO | WO 2015/145356 | A1 | 10/2015 | |
| WO | WO 2016/174037 | A1 | 11/2016 | |

OTHER PUBLICATIONS

International Search Report form the European Patent Office in corresponding International Application No. PCT/IB2017/058258 dated Apr. 17, 2018.
Written Opinion of the International Searching Authority from the European Patent Office in corresponding International Application No. PCT/IB2017/058258 dated Apr. 17, 2018.

* cited by examiner

APPARATUS AND PROCESS FOR BUILDING TYRES FOR VEHICLE WHEELS

This application is a Section 371 national phase application of International Application No. PCT/IB2017/058258, filed Dec. 21, 2017, which claims priority to Italian Patent Application No. 102016000132442, filed Dec. 29, 2016; the contents of each application is incorporated herein by reference.

TECHNICAL FIELD OF THE INVENTION

The object of the present invention is an apparatus and a process for building tyres for vehicle wheels.

More particularly, the present invention relates to an apparatus and a process for building tyres executed by means of the assembly of a carcass sleeve on a first-phase drum and the subsequent transport of the same carcass sleeve on a second-phase drum. On the abovementioned second-phase drum, the carcass sleeve is shaped until it is made to adhere to a radially outer belt pack and the sidewalls are applied on opposite sides of the carcass sleeve.

STATE OF THE ART

A tyre for vehicle wheels generally comprises a carcass structure comprising at least one carcass ply having end flaps engaged with respective anchoring annular structures. In radially outer position with respect to the carcass structure, a belt structure is associated comprising one or more belt layers, situated in radial superimposition with respect to each other and with respect to the carcass ply, having textile or metallic reinforcement cords with cross orientation and/or substantially parallel to the circumferential extension direction of the tyre. In radially outer position with respect to the belt structure, a tread band is applied, it too is made of elastomeric material like other semi-finished products constituting the tyre. Respective sidewalls made of elastomeric material are also applied on the lateral surfaces of the carcass structure, each extended from one of the lateral edges of the tread band up to the respective anchoring annular structure to the beads. In the tyres of "tubeless" type, the carcass ply is internally covered with a layer of elastomeric material, preferably with butyl base and normally termed "liner", having optimal air impermeability characteristics and being extended from one bead to another.

The productive cycles of a tyre provide that, following a building process in which the various structural components of the tyre itself are made and/or assembled, the built green tyres are transferred into a moulding and vulcanisation line where a moulding and vulcanisation process is actuated, adapted to define the structure of the tyre according to a desired geometry and tread design.

With the term "elastomeric material" it is intended to indicate a composition comprising at least one elastomeric polymer and at least one reinforcement filler. Preferably, such composition also comprises additives such as, for example, a cross-linking agent and/or a plasticiser. Due to the presence of the cross-linking agent, by means of heating such material can be cross-linked, so as to form the final manufactured product.

The terms "radial" and "axial" and the expressions "radially inner/outer" and "axially inner/outer" are used by making reference respectively to a direction perpendicular and to a direction parallel to the rotation axis of the tyre being processed. The terms "circumferential" and "circumferentially" are instead used by making reference to the direction of the annular extension of the tyre being processed.

The document EP1272338 illustrates a drum for building tyres the includes a turn-up mechanism used for building a green tyre. The drum comprises two annular segments spaced from each other in order to each support a bead core and means to radially expand the portion of the tyre situated between the bead cores. The drum is also provided, on each of the sides of the annular segments, with a set of hinged arms provided with rollers placed on terminal ends facing towards the respective annular segment. Means are also provided for moving the arms radially and axially between a first radially closed position and a second radially open position in order to press components of the tyre situated outside the bead cores against the expanded portion of the tyre placed between the bead cores.

The documents EP2403710 and EP2464508 illustrate drums similar to those just described above.

The document WO2012147012, on behalf of the same Applicant, illustrates a process for building tyres for vehicle wheels, in which a carcass sleeve is arranged on a shaping drum comprising two semi-drums and two supports. Each support is operatively associated with one of the half-drums and carries a plurality of turn-up levers having free ends positioned at the respective half-drum. Two anchoring annular structures are arranged around the carcass sleeve and each of the two supports is locked with the respective half-drum. The carcass sleeve is toroidally shaped by introducing pressurised fluid between half-drums and mutually approaching the half-drums. Subsequently, each of the two supports is released from the respective half-drum and each support is approached to the respective half-drum and the free ends of the turn-up levers are lifted until the end flaps of the carcass sleeve are turned up around the anchoring annular structures.

Apparatuses and processes are also known which provide for the toroidal shaping of the carcass sleeve and the application of sidewalls by means of inflatable chambers that provide to apply and turn up each sidewall against a respective side of the carcass.

SUMMARY

In such context, the Applicant has perceived the need to increase the flexibility of the building processes and apparatuses of known type so as to allow the production of tyres that are even quite different from each other, without having to radically change or reset the apparatus employed for such building. In particular, the Applicant has perceived such need with reference to the tyre building, in particular but not exclusively of run-flat tyres, which have sidewalls of different thicknesses, heights and geometries.

The documents EP1272338, EP2403710 and EP2464508 describe processes and apparatuses which provide for the deposition of the carcass structure integrating the sidewalls on the building drum.

The Applicant has also perceived the need to improve the quality of the tyres produced and to ensure the conformity of the same with the design specifications. On such matter, the Applicant has observed that the application of the sidewalls by means of the inflatable chambers of the prior art does not ensure a high process repeatability.

The process with the chambers in fact possesses an intrinsic variability from chamber to chamber due to their manufacturing method and to the variability of properties that the single chamber can have over time due to the variation of elasticity of the constituent elastomeric material. This variability, along with a possible variation of the inflation pressure of the chambers, signifies that the turn-up force of the sidewall is not constant for all the built tyres.

The Applicant has therefore observed that the known processes with inflatable chambers do not allow building tyres with perfectly repeatable geometries and properties.

The Applicant has further observed that the processes with inflatable chambers have a relatively long cycle time since said chambers, in order to perform their task, must be inflated, deformed by means of suitable elements and then deflated.

The Applicant has also observed that the apparatuses with inflatable chambers require very frequent substitution of the chambers due to the degradation of the properties of the elastomeric material constituting the chambers.

The Applicant has perceived that, in order to obtain an increase of the quality of the tyres produced together with a greater productive flexibility and with a lowering of the production costs, it is opportune to apply the sidewalls after the formation of the carcass sleeve and of the beads and by means of members of mechanical type with a defined and stable geometry and not subjected to quick wear.

The Applicant has therefore found that the abovementioned drawbacks can be overcome and the above-listed objectives can be obtained by applying the sidewalls as elements separate from the carcass structure (which is instead pre-assembled) by means of application levers which first provide—being arranged in a stable configuration of partial radial opening—to point and fix an axial end of the sidewalls to the carcass and then to overturn the sidewalls themselves by making them adhere against the sides of the carcass.

According to one aspect, the present invention therefore regards a process for building tyres for vehicle wheels.

The process provides for applying sidewalls on opposite sides of a carcass sleeve placed on a shaping drum.

Preferably, the process comprises: arranging a carcass sleeve comprising at least one carcass ply and two beads on a shaping drum comprising two half-drums and two supports, wherein each of the beads is supported by one of the two half-drums, wherein each support is operatively associated with one of the half-drums and carries a plurality of application levers having free ends facing towards the respective half-drum.

The process provides for toroidally shaping the carcass sleeve supported by the two half-drums.

The process provides for applying sidewalls on opposite sides of the carcass sleeve.

The application of the sidewalls comprises: arranging each sidewall as a ring around the application levers of an respective support, making an axial appendage of said sidewall protrude axially beyond the free ends of the respective application levers.

The application of the sidewalls comprises: radially opening the free ends of the application levers of each support so as to make the respective sidewall radially expand, wherein said axial appendage remains radially more contracted with respect to the remaining portion of the sidewall and converges towards a rotation axis of the shaping drum.

The application of the sidewalls comprises: axially approaching the free ends of the application levers of each support to the respective half-drum up to engaging said axial appendage with the carcass sleeve.

The application of the sidewalls comprises: further and radially opening the free ends of the application levers of each support up to overturning the respective sidewall and making it adhere against a side of the carcass sleeve.

According to a different aspect, the present invention regards an apparatus for building tyres for vehicle wheels, comprising a shaping drum comprising two half-drums and two supports.

Each half-drum comprises support elements configured for engaging beads of a carcass sleeve.

Each support is operatively associated with one of the half-drums and carries a plurality of application levers having free ends facing towards the respective half-drum.

The application levers of each support are movable among:

a contracted configuration, wherein said application levers lie substantially parallel to a rotation axis of the shaping drum, an intermediate configuration, wherein said application levers are in a partially radially open position, an expanded configuration, wherein said application levers are radially open.

Each support is configured for carrying a respective sidewall arranged as a ring around the application levers.

Each support is axially movable with respect to the respective half-drum in order to carry the free ends of the application levers in proximity to the support elements of the respective half-drum while said application levers are fixed in the intermediate configuration.

In other words, the expansion of the application levers ensures that the axial end of the sidewall is placed substantially vertically. The sidewall is radially expanded except for the part projectingly deposited, which tends to remain with a smaller diameter, i.e. directed radially inwards towards the centre of the half-drum. Such end is radially more contracted and remains arranged in front of the end of the levers that can apply it on the carcass sleeve.

The Applicant deems that the present invention allows building a wider range of tyres with sidewalls of size and geometries that are even quite different from each other, also provided with reinforcement lunettes for "run-flat" tyres and/or with large sizes, e.g. up to 210 mm height.

The Applicant also deems that the present invention allows improving the quality of the built tyres and the repeatability of the building process, allowing the attainment of high quality standards.

The Applicant further deems that the present invention allows reducing the building time, the apparatus set-up time and the maintenance time thereof, with a consequent reduction of the production costs.

The present invention, in at least one of the aforesaid aspects, can have one or more of the preferred characteristics, which are described hereinbelow.

Preferably, arranging the carcass sleeve comprises: positioning the carcass sleeve around the two half-drums, wherein the carcass sleeve has a tubular shape with the beads radially projecting towards the rotation axis.

Preferably, arranging the carcass sleeve comprises: axially inserting the shaping drum through the pre-assembled carcass sleeve up to arranging said carcass sleeve around the two half-drums.

Preferably, the support elements are movable between a contracted configuration and a radially expanded configuration.

Preferably, arranging the carcass sleeve comprises: radially expanding the support elements up to engaging the beads of the carcass sleeve.

Preferably, the support elements comprise radially outer support elements configured for engaging against axially inner portions of the beads.

Preferably, the support elements comprise radially inner support elements configured for engaging against radially inner portions of the beads.

Preferably, the radially outer support elements and the radially inner support elements are movable, preferably independently of one another, between a respective contracted configuration and a respective radially expanded configuration.

Preferably, arranging the carcass sleeve comprises: engaging radially outer support elements of each half-drum against axially inner portions of the beads so as to place the carcass sleeve under axial tension.

Preferably, arranging the carcass sleeve comprises engaging radially inner support elements of each half-drum against radially inner portions of the beads, preferably so as to sealingly seal a volume within the carcass sleeve.

Preferably, in the radially expanded configuration, the support elements are in a radial position corresponding to a radial position of the free ends of the application levers when said application levers are in the intermediate configuration.

Preferably, the radially outer support elements in the radially expanded configuration have radially peripheral portions axially facing towards the free ends of the application levers when said application levers are in the intermediate configuration.

Preferably, the half-drums are axially movable with respect to one another between a spaced position and an approached position.

Preferably, toroidally shaping the carcass sleeve comprises axially moving the two half-drums close to each other.

Preferably, toroidally shaping the carcass sleeve comprises introducing a pressurised gas in a volume radially within the carcass sleeve.

Preferably, during the toroidal shaping of the carcass sleeve, it is provided to apply a radially outer portion of the carcass sleeve against a radially inner portion of a belt structure.

Preferably, it is provided to engage the axial appendages with the carcass sleeve after the toroidal shaping of the carcass sleeve.

Alternatively, it is provided to engage the axial appendages with the carcass sleeve prior to the toroidal shaping of the carcass sleeve.

Preferably, arranging each sidewall as a ring around the application levers of a respective support comprises: dispensing and winding a section of sidewall around the application levers and mutually joining a head end and a tail end of said section in a respective junction area.

Preferably, it is provided to arrange each sidewall as a ring around the application levers of a respective support when the application levers are in the contracted configuration.

Preferably, prior to the winding of the section of sidewall, it is provided to arrange at least one support plate in radially outer position with respect to the free ends of the application levers at the junction area.

Preferably, each of the supports comprises at least one support plate situated in radially outer position with respect to the free ends of the application levers.

Such plate offers a substantially flat surface against which the head and tail ends can be pressed in order to execute a correct junction.

Preferably, two support plates are provided, adjacent to each other, and each superimposed on a respective application lever.

Preferably, said at least one support plate extends axially beyond the free ends in order to support the axial appendage of the sidewall during the execution of the junction.

Preferably, said at least one support plate is movable between a retracted position, in which it lies totally superimposed on at least one application lever, and an extracted position, in which it extends axially beyond the free ends of the application levers.

Preferably, it is provided to retract said at least one support plate prior to radially opening the free ends. In this manner, the axial appendage is allowed to remain contracted without the risk of damaging the sidewall during the radial expansion thereof.

Preferably, the application levers of each support are arranged facing each other to form, at least when they are in the contracted configuration, a cylindrical body.

Preferably, the sidewall, including the axial appendage, arranged as a ring around the application levers has a cylindrical shape when said application levers are in the contracted configuration.

Preferably, when said application levers are in the contracted configuration, the axial appendage which extends beyond the free ends has a diameter equal to that of the sidewall portion supported by the application levers.

Preferably, each application lever is hinged to the support at a proximal end thereof opposite the free end.

Preferably, in the intermediate configuration and in the expanded configuration, the application levers are open to delimit a frustoconical surface diverging towards the respective half-drum.

Preferably, when the free ends are radially open, i.e. in the intermediate configuration, the axial appendage is frustoconical and converges towards the respective half-drum.

Preferably, it is provided to axially approach the free ends of the application levers of each support to the respective half-drum while said levers are fixed in a partially radially open position.

Preferably, it is provided to overturn the sidewalls and make them adhere against the sides of the carcass sleeve after the toroidal shaping of the carcass sleeve.

Preferably, overturning the respective sidewall and making it adhere against a side of the carcass sleeve comprises pressing, by means of the free ends, said sidewall against said side.

Preferably, each of the free ends carries at least one application roller.

Preferably, the application rollers lie on a concentric circular path with respect to the rotation axis.

Preferably, the axial appendage extends axially beyond the application rollers.

Preferably, overturning the respective sidewall and making it adhere against a side of the carcass sleeve comprises pressing, by means of the application rollers, said sidewall against said side.

Preferably, each of the free ends carries at least one main application roller and at least one auxiliary application roller, wherein the auxiliary application roller is articulated to the free end, preferably by means of a lever.

Preferably, in the contracted configuration, the lever and the auxiliary application roller are aligned with the respective application lever.

Preferably, in the contracted configuration, the axial appendage extends beyond the main application rollers.

Preferably, in the contracted configuration, the axial appendage extends above the auxiliary application rollers.

Preferably, when the free ends are radially open, i.e. in the intermediate configuration and in the expanded configuration, the auxiliary application rollers lie in a more radially internal position than the main application rollers.

Preferably, when the free ends are radially open, the axial appendage assumes the radially contracted shape.

Preferably, overturning the respective sidewall and making it adhere against a side of the carcass sleeve comprises pressing, by means of the main application rollers and also the auxiliary application rollers, said sidewall against said side.

Preferably, in one embodiment, engaging said axial appendage with the carcass sleeve comprises: abutting and adhering a surface of the axial appendage of the sidewall facing towards the carcass sleeve against an axially outer annular zone of the carcass sleeve.

Preferably, said surface of the axial appendage is a frustoconical surface.

Preferably, it is provided to press the surface of the axial appendage by means of the free ends, more preferably by means of the application rollers or the main application rollers.

Preferably, said axial appendage is engaged with the carcass sleeve via adhesion without any mechanical lock. In this manner, one avoids the risk of generation of non-uniformity under the bead.

Preferably, in a different embodiment, engaging said axial appendage with the carcass sleeve comprises: arranging a terminal end of the axial appendage of the sidewall in a radially inner position with respect to respective bead and locking said terminal end between said bead and radially inner support elements of the respective half-drum.

In other words, the terminal end of the axial appendage is pinched between the bead and the radially inner support elements and then mechanically locked in order to execute the subsequent turn-up. In this manner, a stable and secure positioning of the sidewall is obtained.

Preferably, after the locking of the terminal end between the bead and the radially inner support elements and prior to the toroidal shaping of the carcass sleeve, the free ends of the application levers of each support are axially moved away from the respective half-drum.

Preferably, after the toroidal shaping of the carcass sleeve, the free ends of the application levers of each support are approached again and then further and radially opened.

Preferably, the apparatus comprises two independent motors, each operatively connected to a respective support and configured for axially moving said supports with respect to one another.

Preferably, the apparatus comprises transmission mechanisms operatively active between each of the two motors and the respective application levers for moving said application levers between the contracted configuration, the intermediate configuration and the expanded configuration, preferably by the axial movement of the supports.

Since each support is moved by a respective motor, it is possible to provide for asymmetric movements for the application levers of the two supports, so as for example to make tyres with asymmetric sidewalls.

In addition, it is possible to control the turn-up torque of each group of application levers.

It is also possible to control the torque absorption in an independent manner, so to be able to recognise which of the supports requires maintenance.

Preferably, the apparatus comprises a first motor operatively connected to the shaping drum and configured for making it rotate around a rotation axis thereof.

Preferably, the apparatus comprises a second motor operatively connected to the half-drums and configured for axially moving said half-drums with respect to one another.

Preferably, the apparatus comprises first transmission mechanisms operatively active between the second motor and the support elements for moving them between the contracted configuration and the radially expanded configuration by axial movement of the half-drums.

Preferably the abovementioned two motors dedicated for the supports define a third and a fourth motor.

Further characteristics and advantages will be more evident from the detailed description of preferred but not exclusive embodiments of an apparatus and of a process for building tyres for vehicle wheels according to the present invention.

DESCRIPTION OF THE DRAWINGS

Such description will be set forth hereinbelow with reference to the enclosed drawings, provided only as a non-limiting example, in which.

DETAILED DESCRIPTION

Figure 1:
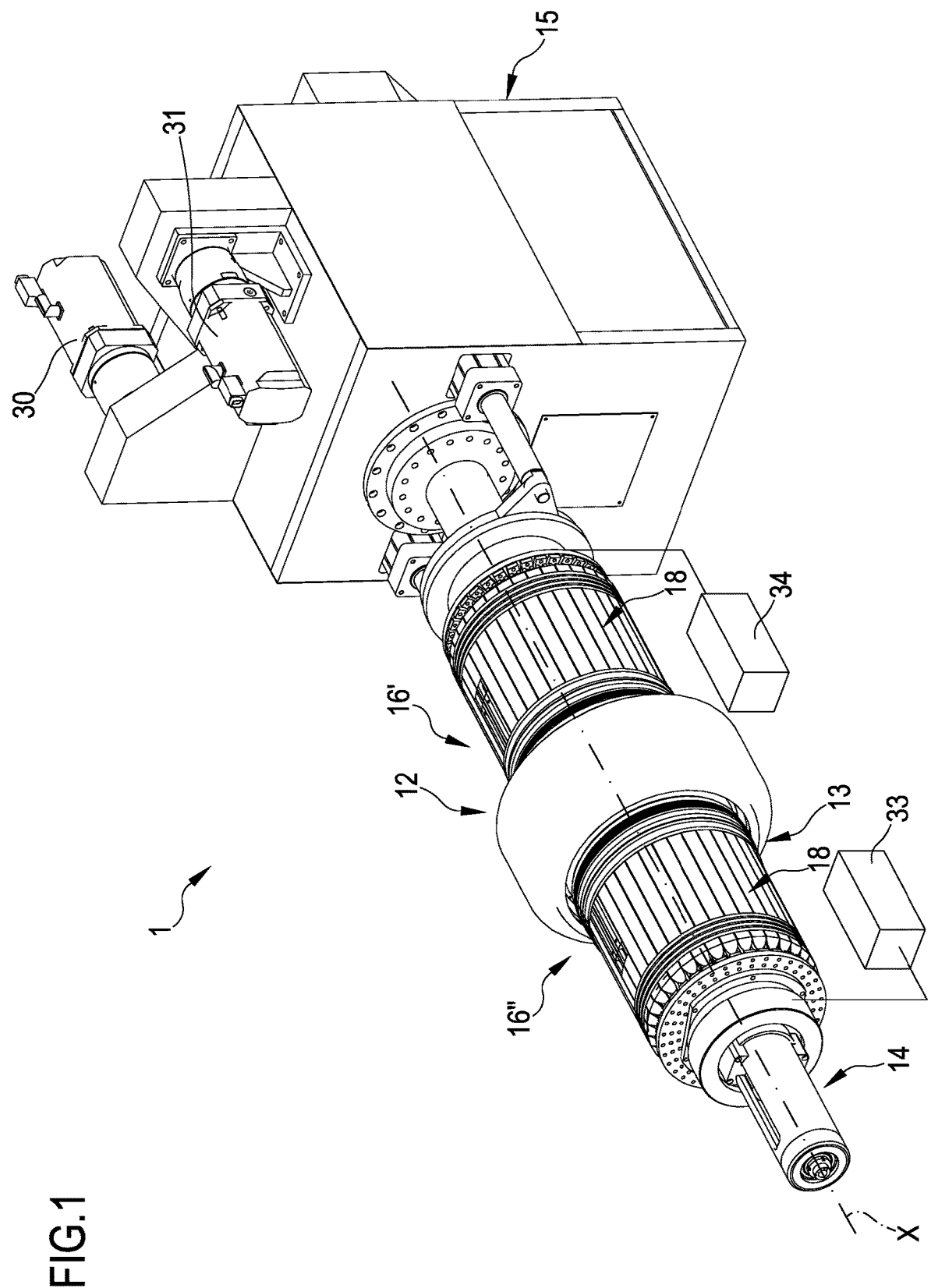
FIG. 1 shows a perspective view of an apparatus for building tyres for vehicle wheels according to the present invention combined with a carcass structure.

With reference to FIG. 1, reference number 1 overall indicates an apparatus for building tyres for vehicle wheels constituting part of a plant (not shown in its entirety) for making tyres 2 for vehicle wheels.

Figure 3:
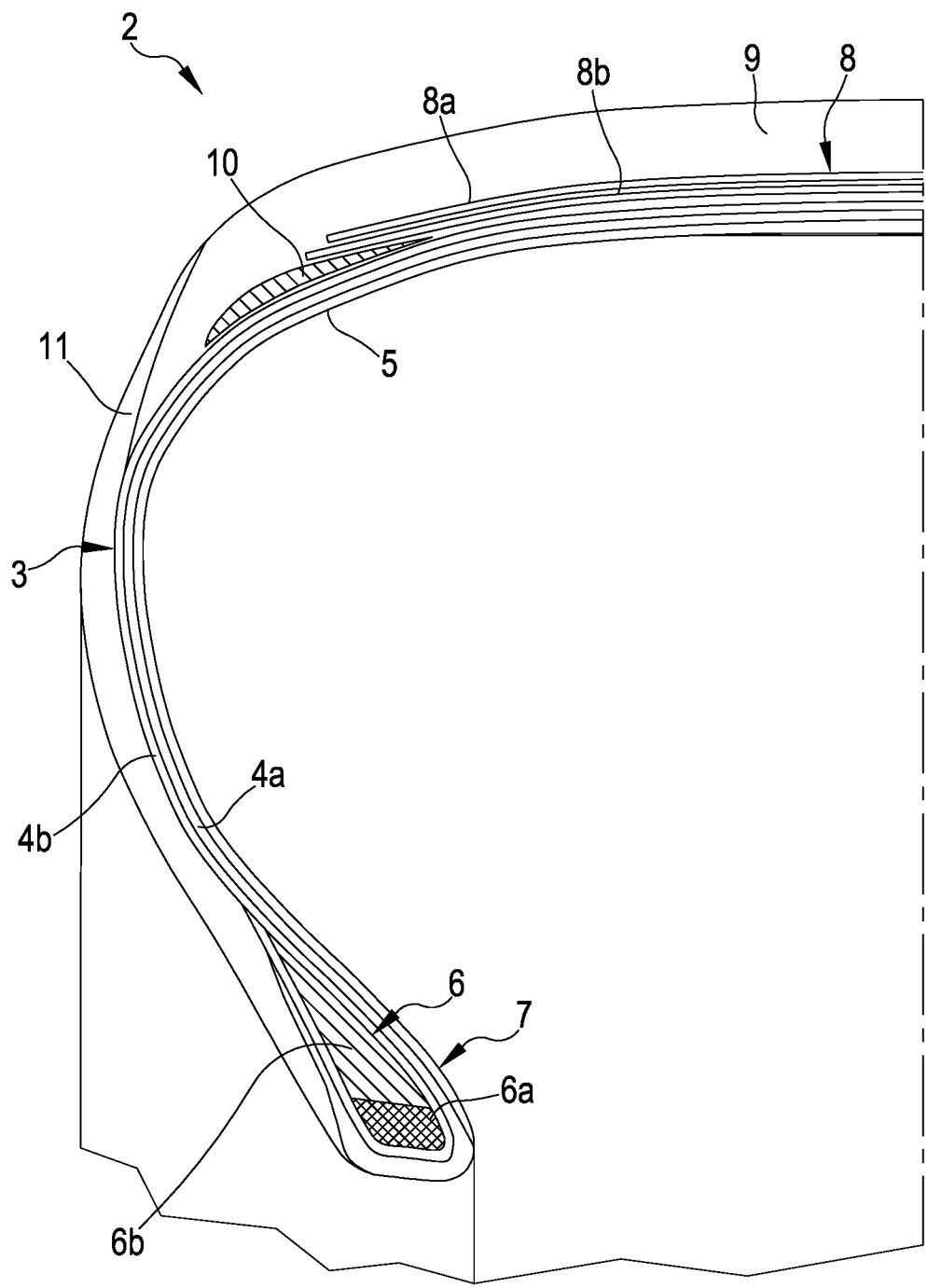
FIG. 3 is a radial half-section of a tyre for vehicle wheels made according to the process and with the apparatus of the present invention.

A tyre 2, at least partly made with said apparatus 1, is illustrated in FIG. 3 and essentially comprises a carcass structure 3 having two carcass plies 4a, 4b. A layer of impermeable elastomeric material or so-called liner 5 is applied inside the carcass ply/plies 4a, 4b. Two anchoring annular structures 6, each comprising a so-called bead core 6a carrying an elastomeric filler 6b in radially outer position, are engaged with respective end flaps of the carcass plies 4a, 4b. The anchoring annular structures 6 are integrated in proximity to zones normally identified with the name "beads" 7, at which there is usually the engagement between the tyre 2 and a respective mounting rim, not shown. A belt structure 8 comprising belt layers 8a, 8b is circumferentially applied around the carcass ply/plies 4a, 4b, and a tread band 9 is circumferentially superimposed on the belt structure 8. The belt structure 8 can be associated with so-called "under-belt inserts" 10, each situated between the carcass plies 4a, 4b and one of the axially opposite terminal edges of the belt structure 8. Two sidewalls 11, each extended from the corresponding bead 7 to a corresponding lateral edge of the tread band 9, are applied in laterally opposite positions on the carcass plies 4a, 4b.

The plant, not illustrated in its entirety, provides for a tyre production line comprising a carcass building line, an outer sleeve building line, and at least one moulding and vulcanisation unit, operatively arranged downstream of the aforesaid building line.

In the carcass building line, forming drums are moved between different stations for dispensing semi-finished products arranged to form, on each forming drum, a carcass sleeve 12 comprising the carcass plies 4a, 4b, the liner 5, the anchoring annular structures 6.

Simultaneously, in the outer sleeve building line, one or more auxiliary drums, not illustrated, are sequentially moved between different prearranged work stations to form, on each auxiliary drum, an outer sleeve comprising at least the belt structure 8, the tread band 9.

The production line also comprises an assembly station provided with the apparatus according to the invention, at which the outer sleeve is coupled to the carcass sleeve 12, the tread band 9 is applied in radially outer position with respect to the outer sleeve and the sidewalls 11 are applied on the sides of the carcass sleeve 12.

The built tyres 2 are then transferred to the moulding and vulcanisation unit.

FIG. 1 illustrates the apparatus 1 combined with the carcass sleeve 12.

The apparatus 1 comprises a shaping drum 13 supported by a mandrel 14 in turn projectingly carried by a base 15.

The shaping drum 13 comprises two half-parts 16', 16" substantially symmetrical with respect to each other and each formed by a half-drum 17 and by a support 18. Since said half-parts 16', 16" are very similar structurally and symmetric, only a first 16' of said two half-parts 16', 16" will be described in detail hereinbelow.

The half-drum 17 of such first half-part 16' faces towards the half-drum 17 of the second half-part 16" while the two supports 18 are situated on opposite sides of the two half-drums 17 (FIG. 1).

Figure 4:
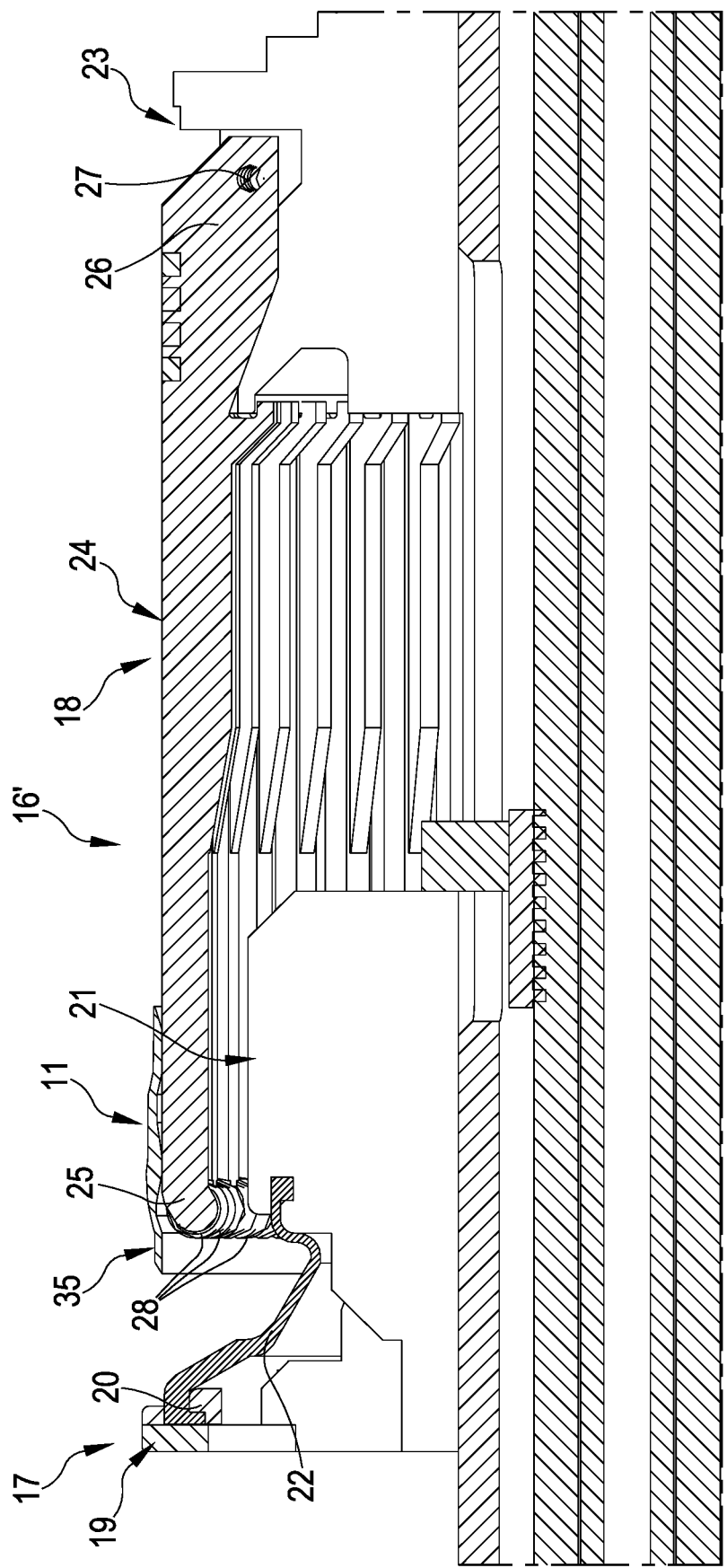
FIG. 4 illustrates an axial half-section of a portion of the element of FIG. 2.

The half-drum 17 comprises a plurality of radially outer support elements 19 and a plurality of radially inner support elements 20 arranged around a rotation axis "X" of the mandrel 14. In FIG. 4, one of said radially outer support elements 19 and one of said radially inner support elements 20 are visible.

The radially outer support elements 19 are radially movable between a respective contracted configuration and a respective radially expanded configuration. In the contracted configuration, visible in FIGS. 4, 6 and 7, the radially outer support elements 19 lie radially adjacent to each other and situated in a position closer to the mandrel 14. In the radially expanded configuration, visible in FIGS. 9-14, the radially outer support elements 19 lie in a position further away from the mandrel 14.

Also the radially inner support elements 20 are radially movable between a respective contracted configuration and a respective radially expanded configuration. In the contracted configuration, visible in FIGS. 4, 9 and 10, the radially inner support elements 20 lie radially adjacent to each other and situated in a position closer to the mandrel 14. In the radially expanded configuration, visible in FIGS. 11-14, the radially inner support elements 20 lie in a position further away from the mandrel 14.

In addition, the half-drums 17 are axially movable on the mandrel 14, moving close to or away from each other between a spaced position and an approached position. The axial displacement of the half-drum 17 preferably causes the joint axial movement of the respective radially inner 20 and outer 19 support elements (see FIGS. 9 and 10).

Movement mechanisms, not shown in detail, operate between the radially outer support elements 19 and radially inner support elements 20 and a central body 21 of the half-drum 17 and/or the mandrel 14 in order to actuate such radial and axial movements.

As is visible in FIGS. 10-14, the radially outer support elements 19 have radially peripheral portions configured for engaging against axially inner portions of the beads 7 of the carcass sleeve 12.

As is visible in FIGS. 11-14, the radially inner support elements 20 have radially peripheral portions configured for engaging with radially inner portions of said beads 7.

The radially outer support elements 19 of the two half-drums 17 are situated in an axially inner position with respect to the radially inner support elements 20. In other words, said radially outer support elements 19 are axially facing each other.

Each half-drum 17 also comprises a flexible or folding membrane 22 which connects the radially peripheral portions of the radially inner support elements 20 with the central body of the half-drum 17 so as to hide and protect moving parts of said radially outer 19 and inner 20 support elements and also the abovementioned movement mechanisms, in addition to ensuring the air seal on the beads 7.

With reference to FIG. 4, each support 18 comprises a base body 23 arranged around the mandrel 14 and associated with the respective half-drum 17. The base body 23 carries a plurality of application levers 24 having free ends 25 facing towards the respective half-drum 17 and proximal ends 26 hinged to the base body 23. Each lever 24 can therefore partially rotate around an axis perpendicular to the rotation axis "X" of the mandrel 14 and placed at a respective hinge 27.

The application levers 24 of each support 18 are movable among a contracted configuration, an intermediate configuration and an expanded configuration.

In the contracted configuration, said application levers 24 lie substantially parallel to the rotation axis "X" of the shaping drum 13 and are arranged on a cylindrical or tubular surface to form a kind of cylindrical body (FIGS. 1, 2, 4, 6-10).

Figure 12:
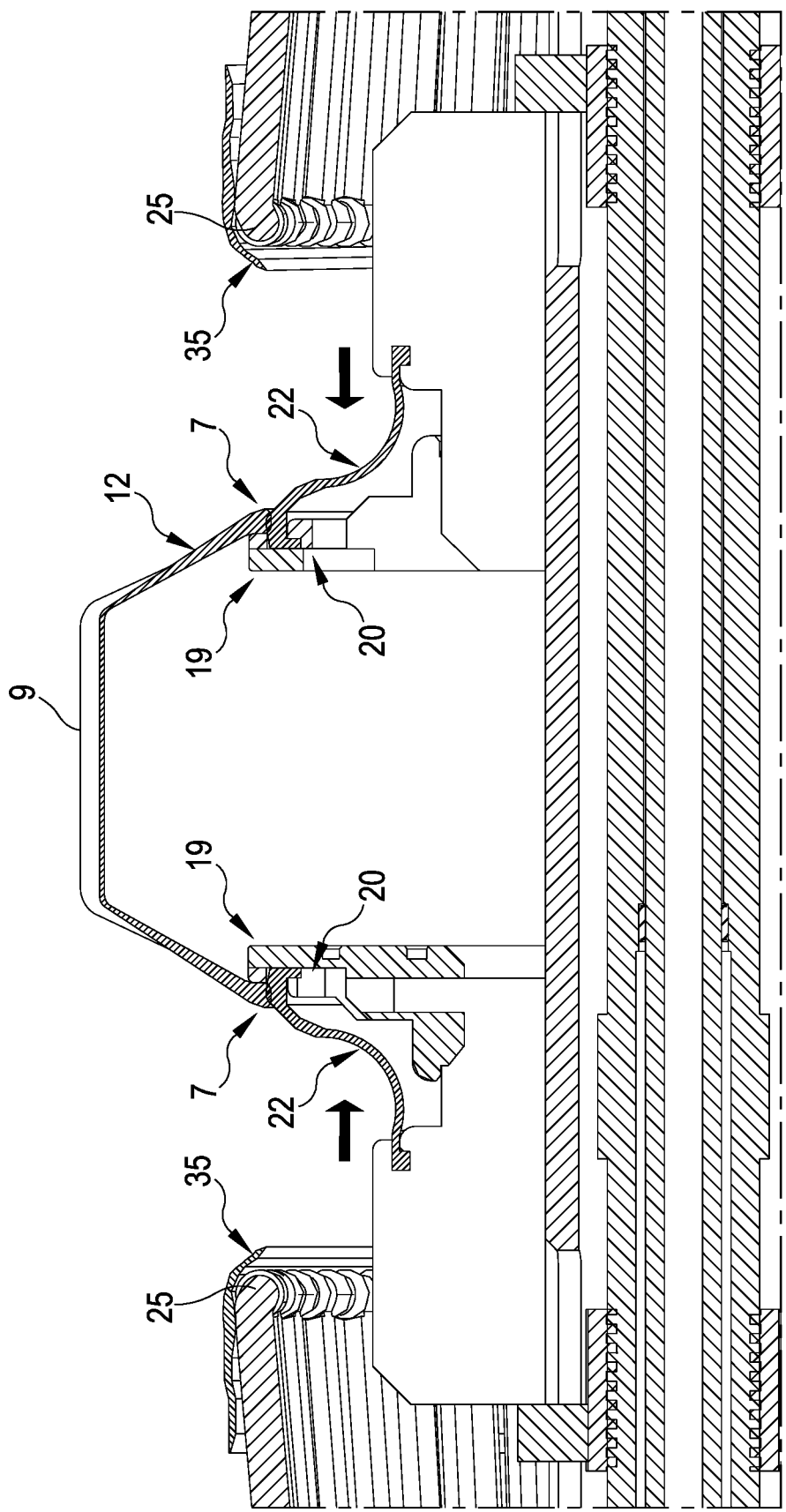
Figure 13:
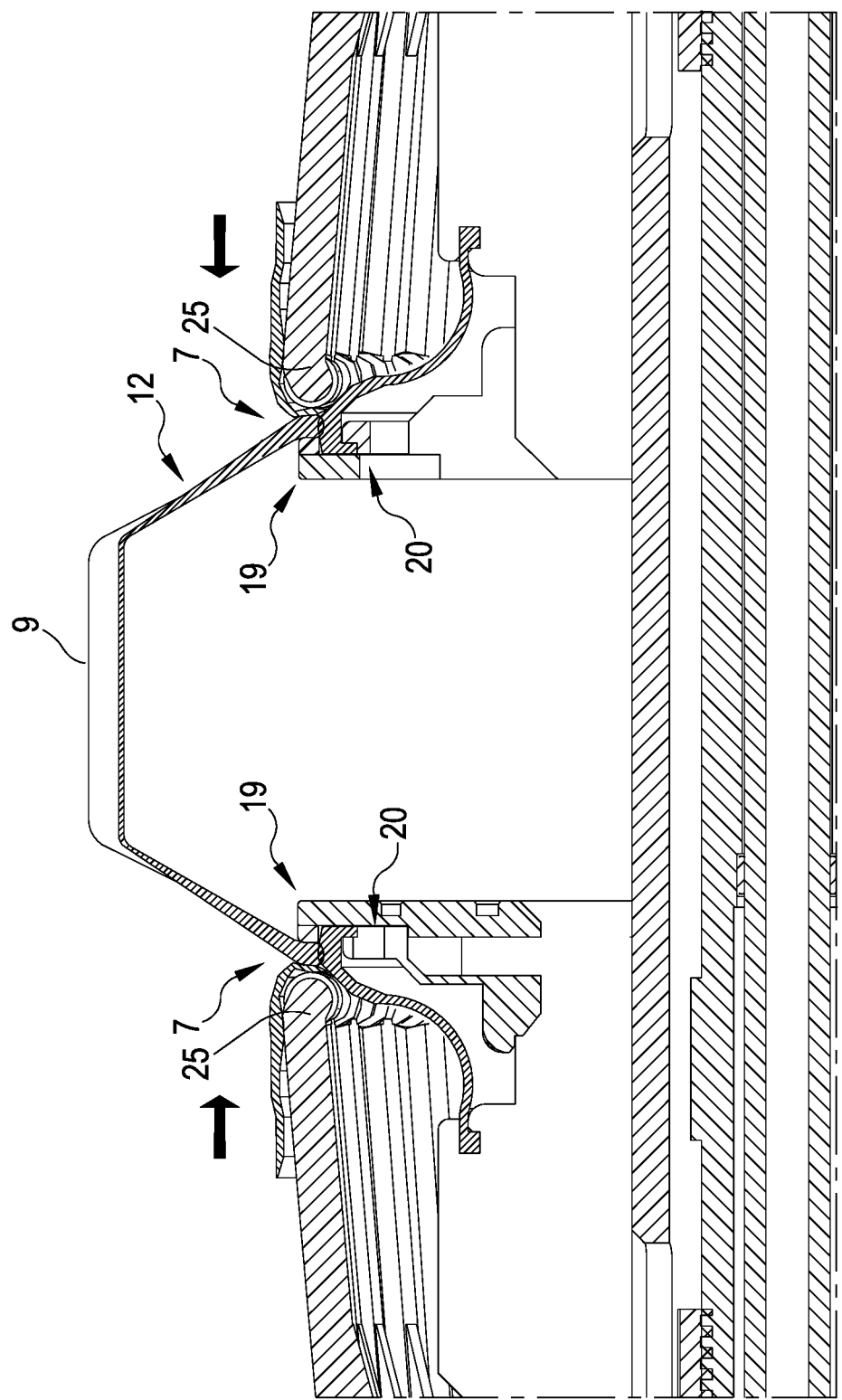

In the intermediate configuration, said application levers 24 are rotated around the respective hinges 27 and are situated in a partially radially open position diverging towards the respective half-drum 17 (FIGS. 12 and 13).

Figure 14:
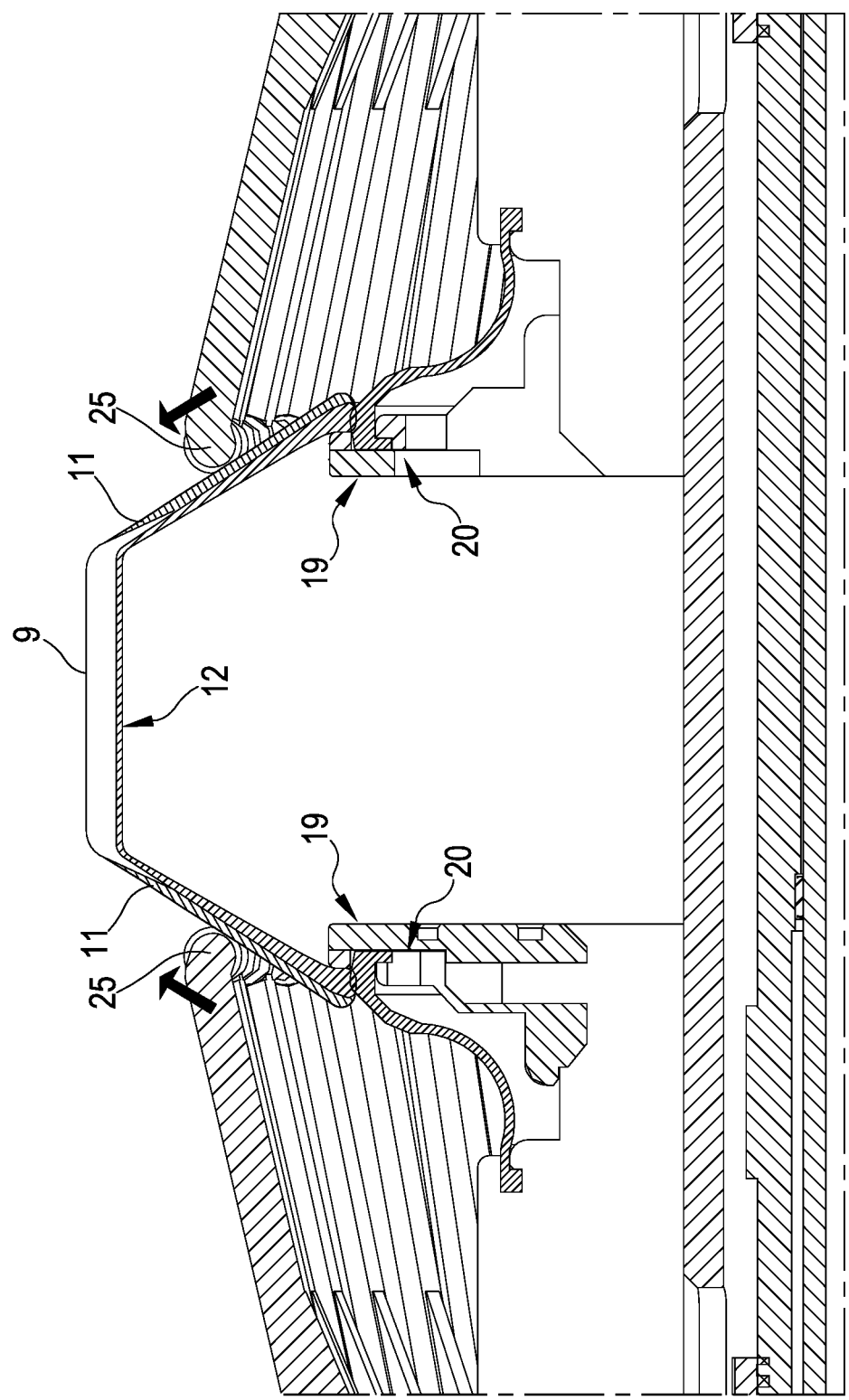

In the expanded configuration, the application levers 24 are further rotated around the respective hinges 27 and are radially more open than in the intermediate position (FIG. 14).

Each free end 25 of the levers 24 carries a respective pair of application rollers 28 side-by-side and idly mounted on said free end 25, so that the application rollers 28 lie on a concentric circular path with respect to the rotation axis "X".

Movement mechanisms, not shown in detail, operate on each support 18 in order to move it axially close to and away from the respective half-drum 17, to move the two supports 18 close to or away from each other and to move the application levers 24 of each support 18 among the abovementioned configurations.

In a preferred embodiment, the apparatus 1 comprises two independent motors, each operatively connected to a respective support 18 and configured for axially moving said supports 18 with respect to one another. In addition, transmission mechanisms, not shown, are operatively active between each of the two motors and the respective application levers 24 for moving said application levers 24 between the contracted configuration, the intermediate configuration and the expanded configuration. The transmission mechanisms are also configured for axially approaching the free ends 25 of the application levers 24 of each support 18 to the respective half-drum 17 while said levers 24 are fixed in the abovementioned partially radially open position (FIGS. 12 and 13). In other words, each support 18 is axially movable with respect to the respective half-drum 17 in order to carry the free ends 25 of the application levers 24 in proximity to the outer and inner support elements 19, 20 of the respective half-drum 17 while said application levers 24 are fixed in the abovementioned intermediate configuration.

Each support 18 also comprises (FIGS. 2, 6 and 7) two support plates 29 adjacent to each other and each superimposed on a respective application lever 24, i.e. placed in radially outer position with respect to said application lever 24, in proximity to the free end 25 thereof.

Figure 2:
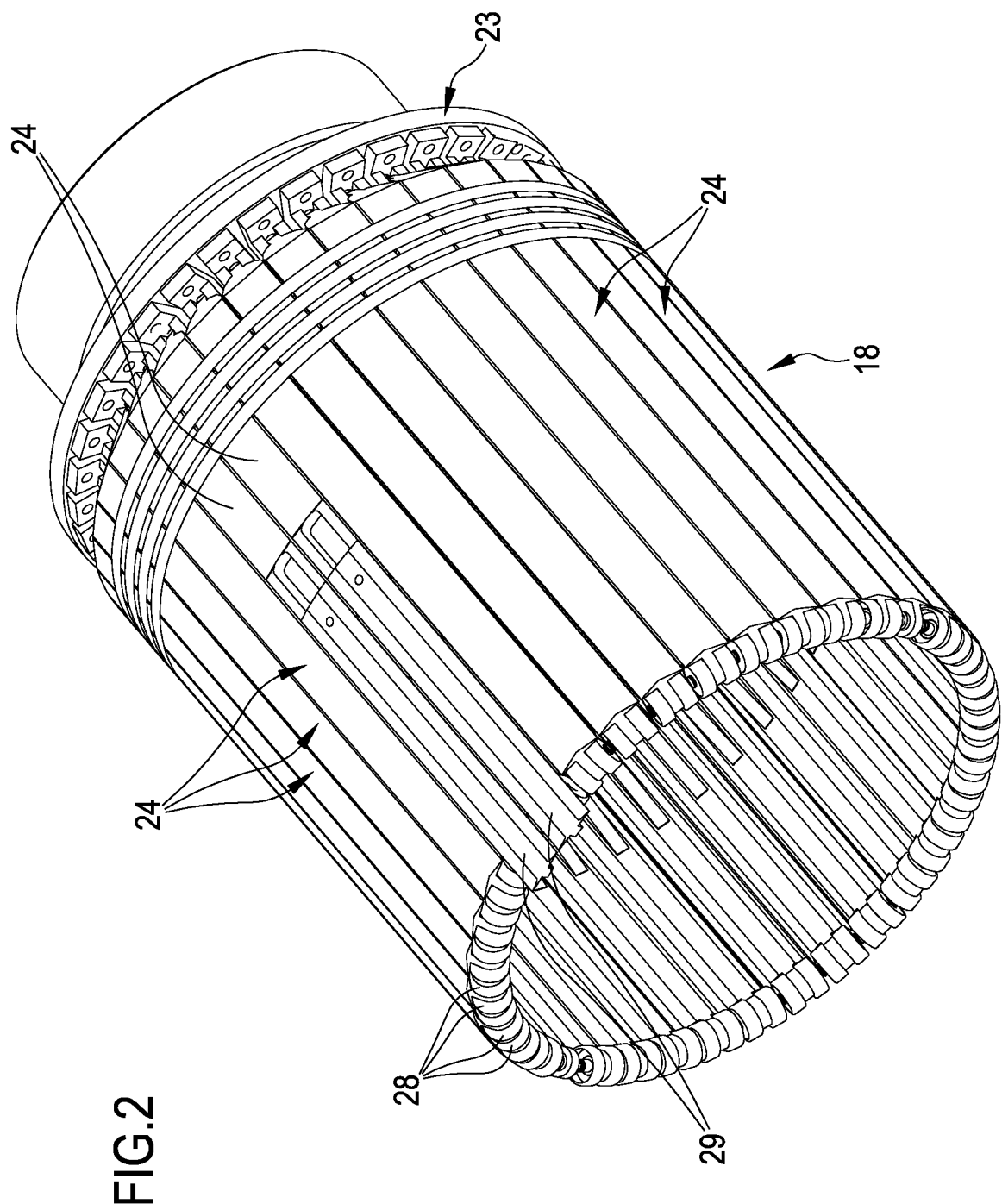
FIG. 2 illustrates an enlarged element of the apparatus of FIG. 1.
Figure 6:
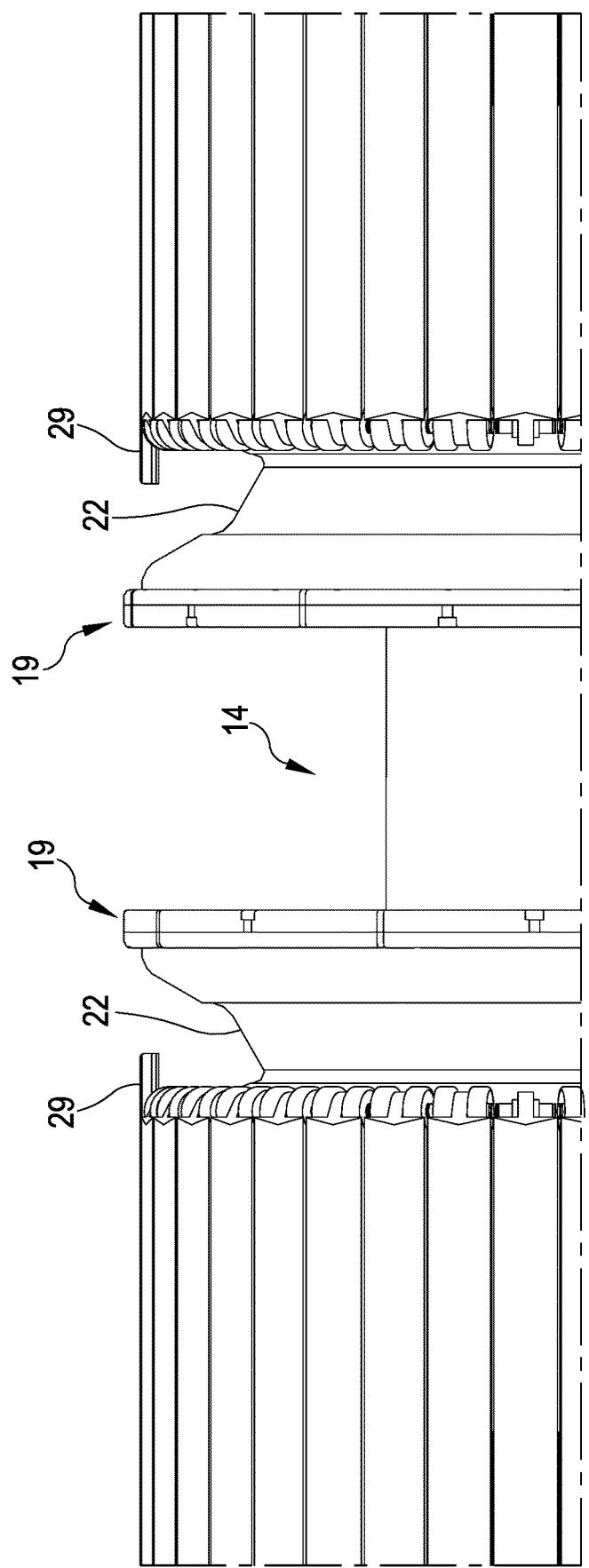
FIGS. 6-14 illustrate successive sequential steps of a process according to the present invention actuated with the apparatus of FIGS. 1, 2 and 4.
Figure 7:
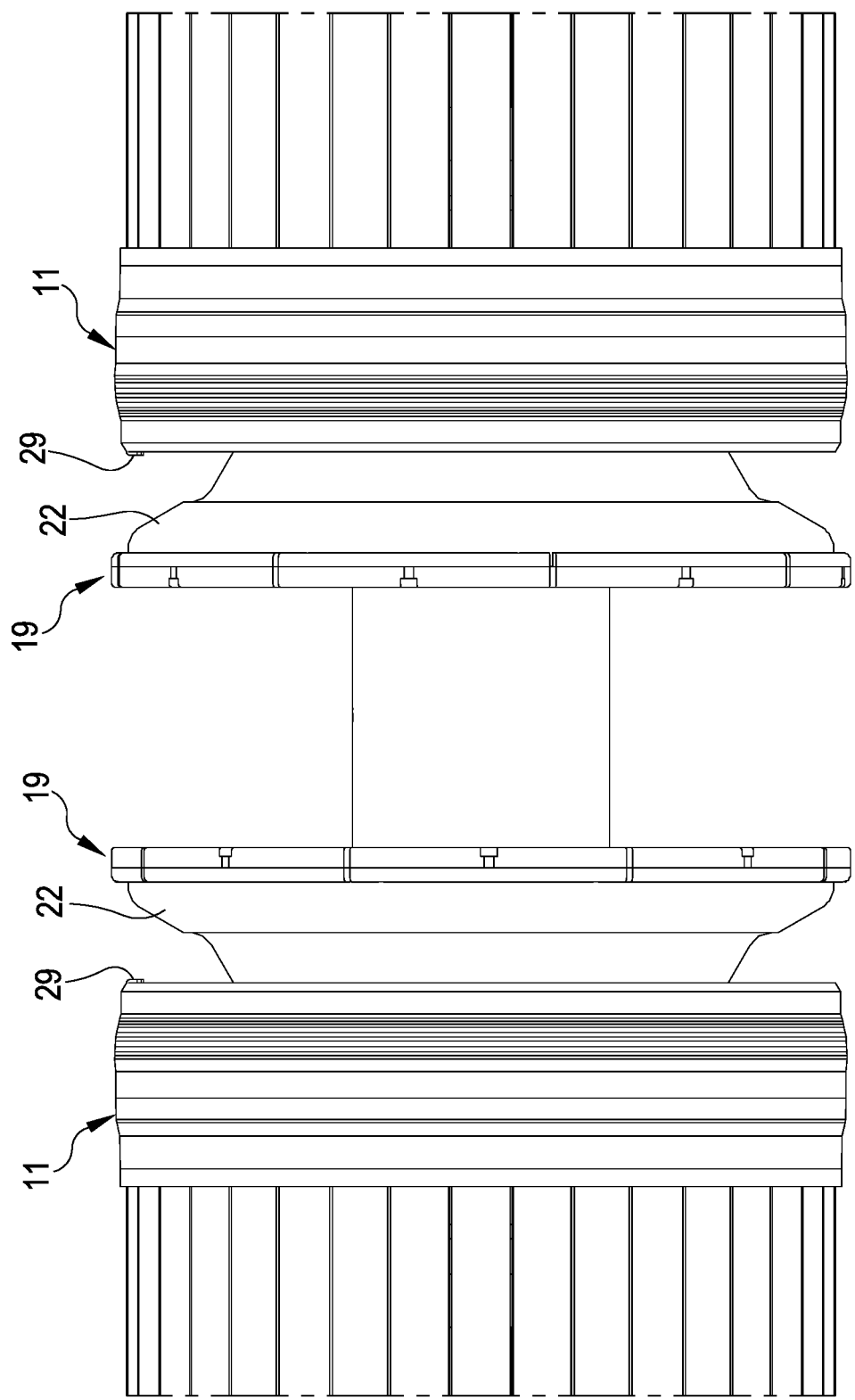

Such support plates 29 are movable along the respective application levers 24, by means of non-illustrated devices, between a retracted position and an extracted position. In the extracted position, the support plates 29 protrude beyond the free ends 25 of the levers 24 and beyond the respective application rollers 28, as illustrated in FIGS. 2, 6 and 7. In such extracted position, the support plates 29 lie in radially outer position with respect to said application rollers 28. In the retracted position, the support plates 29 lie totally superimposed on the respective application levers 24, without protruding beyond the free ends 25 and freeing the respective application rollers 28.

The apparatus 1 comprises a first motor 30 operatively connected to the shaping drum 13 and configured for making it rotate around the rotation axis "X", and a second motor 31 operatively connected to the half-drums 17 and configured for axially moving said half-drums 17 with respect to one another. First transmission mechanisms, not shown, are operatively active between the second motor 31 and the support elements 19, 20 in order to move them between the contracted configuration and the radially expanded configuration by the axial movement of the half-drums 17.

The abovementioned two independent motors dedicated to the supports 18 define a third motor 33 and a fourth motor 34, which are schematically illustrated in FIG. 1.

During use and in accordance with the process that is the object of the present invention, a section of sidewall 11 is wound around the application levers 24 of each support 18 while the support 18 is in the contracted configuration and the support plates 29 are in radially outer position with respect to the free ends 25 of the application levers 24, as in FIGS. 6 and 7.

A head end and a tail end of said section are joined by exerting a pressure on said ends in the respective junction area, defined by the support plates 29, so as to obtain two sidewalls 11 each arranged as a ring around the respective support 18 (FIG. 7). Once such junction is executed, the support plates 29 are carried into the retracted position.

Figure 9:
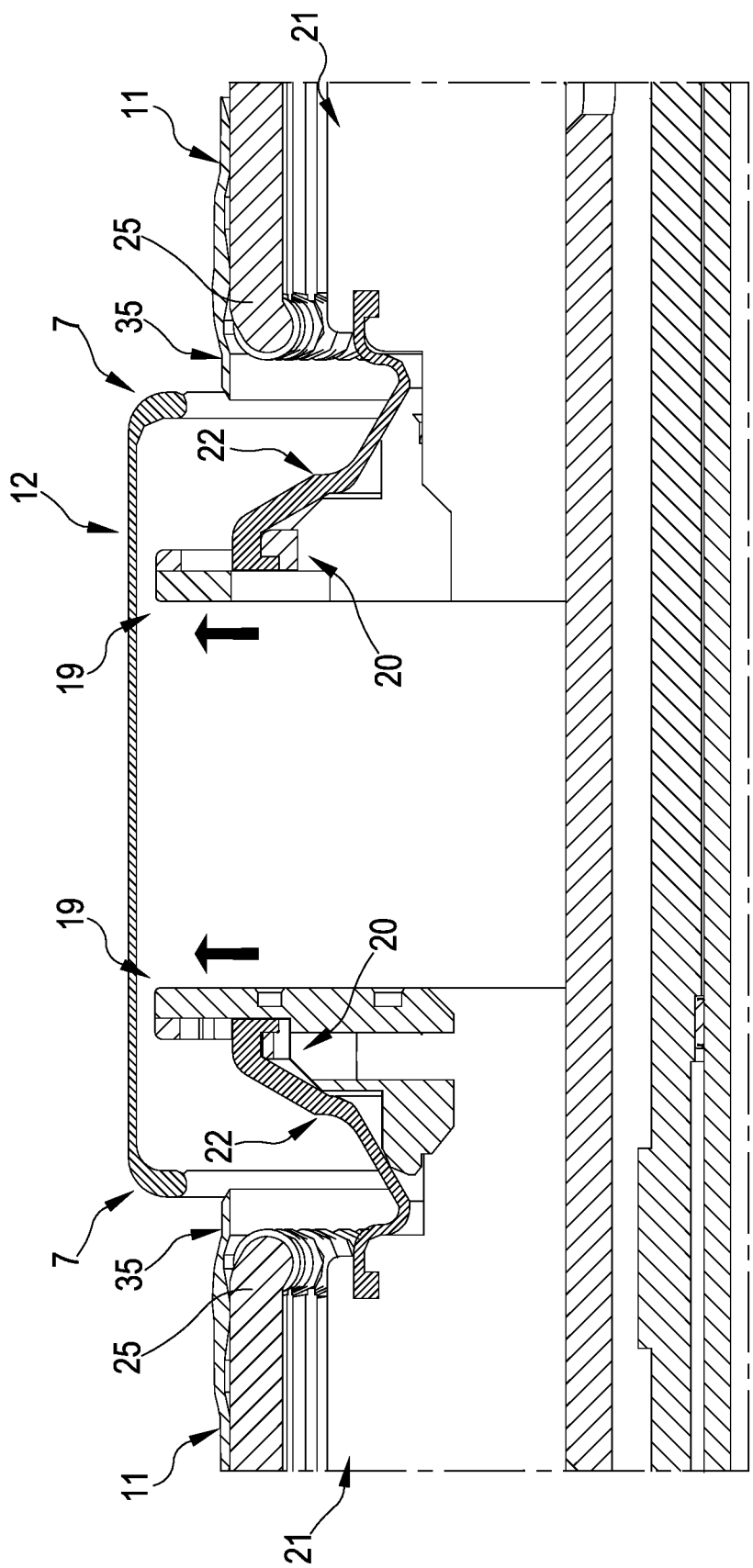
Figure 10:
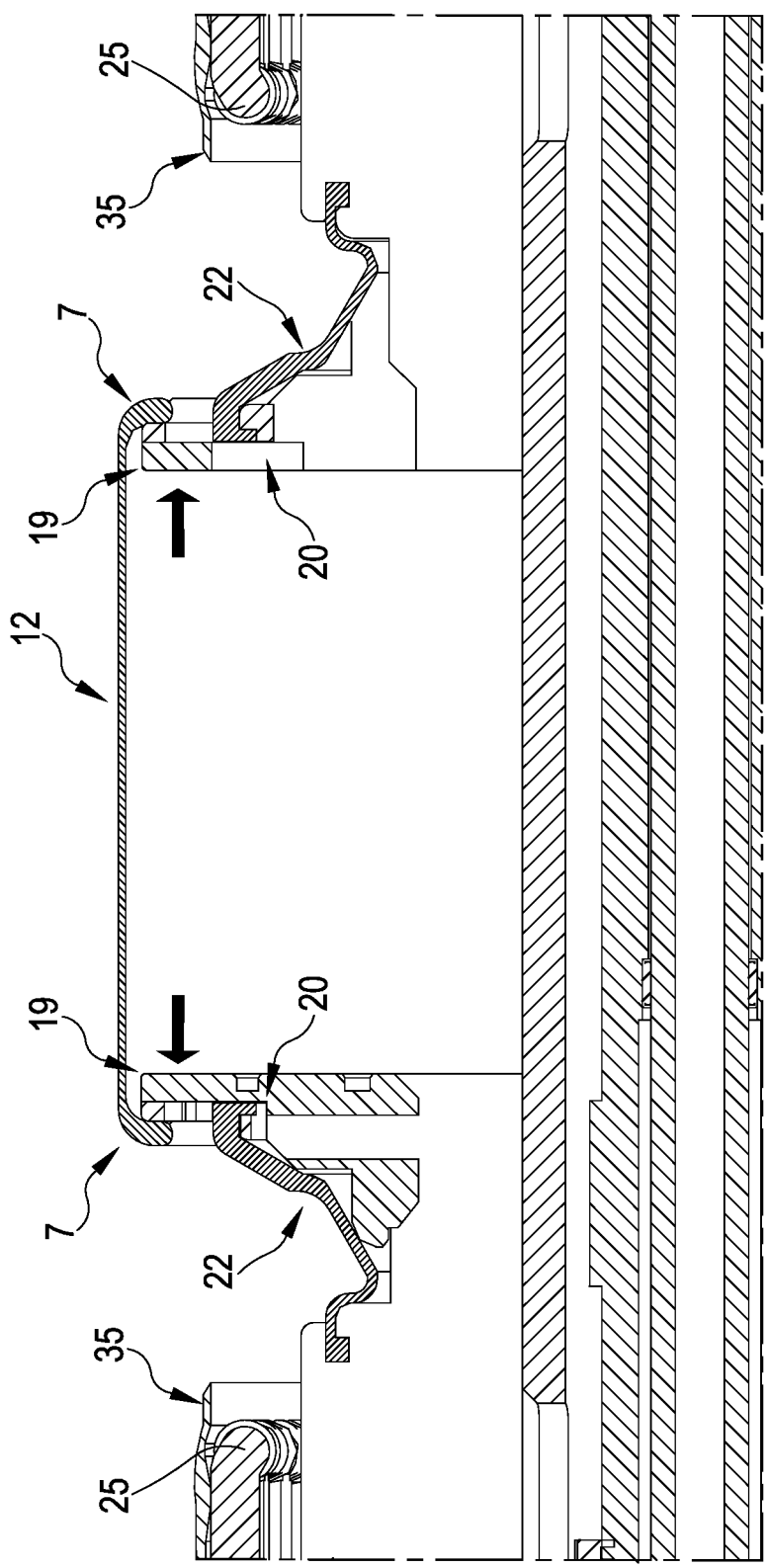

The winding of the sidewall 11 is carried out in a manner such that an axial appendage 35 of said sidewall 11 protrudes axially beyond the free ends 25 and beyond the rollers 28 of the respective application levers 24 (FIGS. 4, 9 and 10). The axial appendage 35 which extends beyond the free ends 25 has a diameter equal to that of the sidewall portion 11 supported by the application levers 24.

Figure 8:
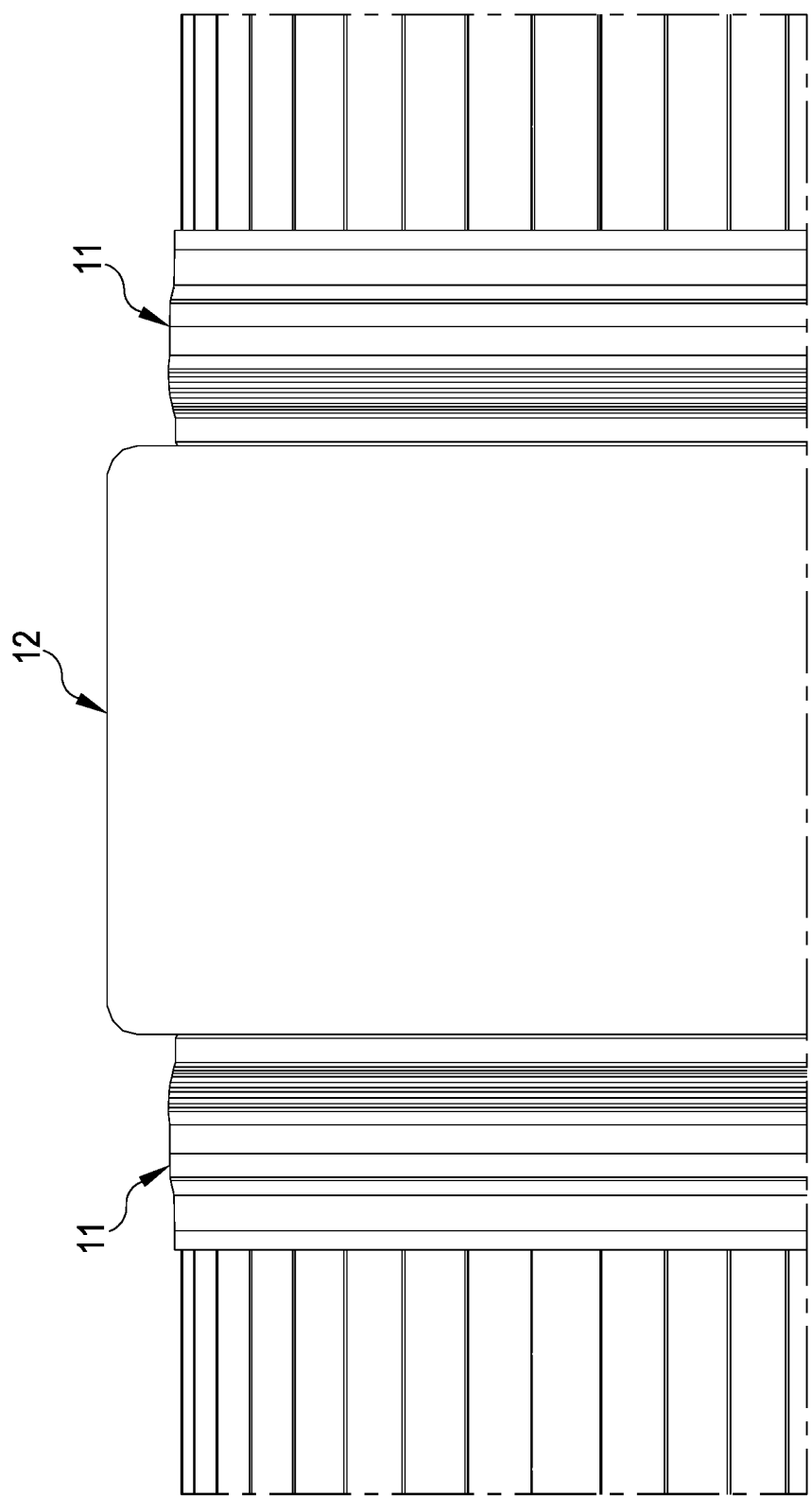

The pre-assembled carcass sleeve 12, carried by a dedicated device that is not illustrated, is arranged around the shaping drum 13 by means of a relative movement which provides for axially inserting said shaping drum 13 through the pre-assembled carcass sleeve 12 up to arranging the carcass sleeve 12 around the two half-drums 17 in an axially centred position between the two supports 18 (FIG. 8). During such movement, the dedicated device engages a radially outer surface of the carcass sleeve 12 while the radially outer support elements 19 and the radially inner support elements 20 are in the contracted position.

The carcass sleeve 12 has a cylindrical tubular shape with the respective beads 7 radially projecting towards the rotation axis "X" of the shaping drum 13.

While the carcass sleeve 12 is still carried by the abovementioned dedicated device, the radially outer support elements 19, which lie axially spaced from the beads 7, are carried into the respective radially expanded configuration of FIG. 9. Subsequently, it is provided to axially move two half-drums 17 away from each other up to engaging the radially outer support elements 19 of each half-drum 17 against the axially inner portions of the beads 7, so as to place the carcass sleeve 12 (FIG. 10) under axial tension.

Figure 11:
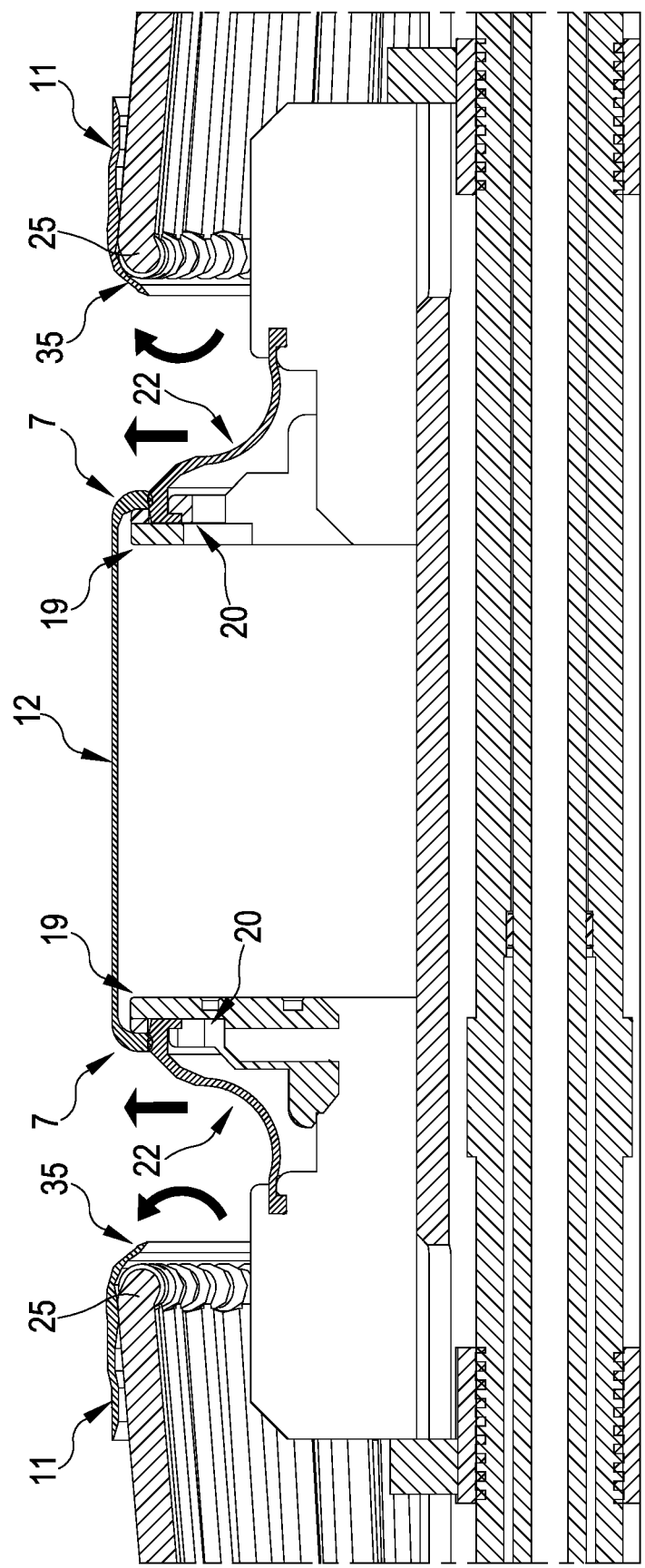

At this point, the radially inner support elements 20 are carried into the respective radially expanded configuration of FIG. 11 up to engaging the radially inner support elements 20 of each half-drum 17 against the radially inner portions of the beads 17, so as to sealingly seal a volume within the carcass sleeve 12 (FIG. 11).

The carcass sleeve 12 is now supported by the shaping drum 13.

Meanwhile, the application levers 24 of each support 18 are brought into the intermediate configuration so as to make the respective sidewall 11 radially expand while the axial appendage 35 remains radially more contracted with respect to the remaining portion of the sidewall 11 and converges towards the central or rotation axis "X" of the shaping drum 13, as illustrated in FIG. 11. In the intermediate configuration, the axial appendage 35 is frustoconical and converges towards the respective half-drum 17.

The carcass sleeve 12 supported by the two half-drums 17 is toroidally shaped by means of mutual axial approaching of the two half-drums 17 and introduction of a pressurised gas in the volume radially within the carcass sleeve 12 (FIG. 11).

Prior to shaping, an assembly formed by the belt structure 4a, 4b and by the tread band 9 is arranged around the carcass sleeve 12 and the toroidal shaping of the abovementioned carcass sleeve 12 causes a radial expansion of the same which therefore, being expanded, is applied against the belt plies 4a, 4b (FIG. 12). Axially opposite flaps of the tread band 9 are brought against opposite sides of the already-shaped carcass sleeve 12 (FIG. 12).

In this configuration, the radially outer support elements 19 are in the radially expanded configuration and have radially peripheral portions axially facing towards the free ends 25 and towards the rollers 28 of the application levers 24 which are situated in the intermediate configuration. In other words, the rollers 28 and the axial appendage 35 of the sidewall 11 bent towards the rotation axis "X" face towards axially outer surfaces of the beads 7.

The two supports 18 with the respective application levers 24 fixed in the intermediate position are axially approached to the carcass sleeve 12 up to engaging the axial appendages 35 against said carcass sleeve 12.

As illustrated in FIG. 13, a surface of the axial appendage 35 is brought, abutted and made to adhere against an axially outer annular zone of the carcass sleeve 12 placed at the beads 7. The surface of the axial appendage 35 is pressed by means of the application rollers 28 so as to make it adhere to the carcass sleeve 12, exploiting the adhesiveness of the elastomeric material constituting the sidewalls 11 and the carcass plies 4a, 4b.

At this point, the application levers 24 are further opened and simultaneously approached to the respective half-drum 17 so as to maintain the rollers 28 in abutment against the carcass sleeve 12 with the interposition of the sidewalls 11. Said further opening, which brings the application levers 24 into the expanded configuration, causes the overturning of the respective sidewall 11 and its complete adhesion against a side of the carcass sleeve 12. As visible in FIGS. 13 and 14, the application rollers 28 progressively turn up and press the sidewalls 11 against the carcass sleeve 12 as they progressively radially open. A radially outer portion of the sidewalls 11 is superimposed on the bend of the tread band 9.

Figure 15:
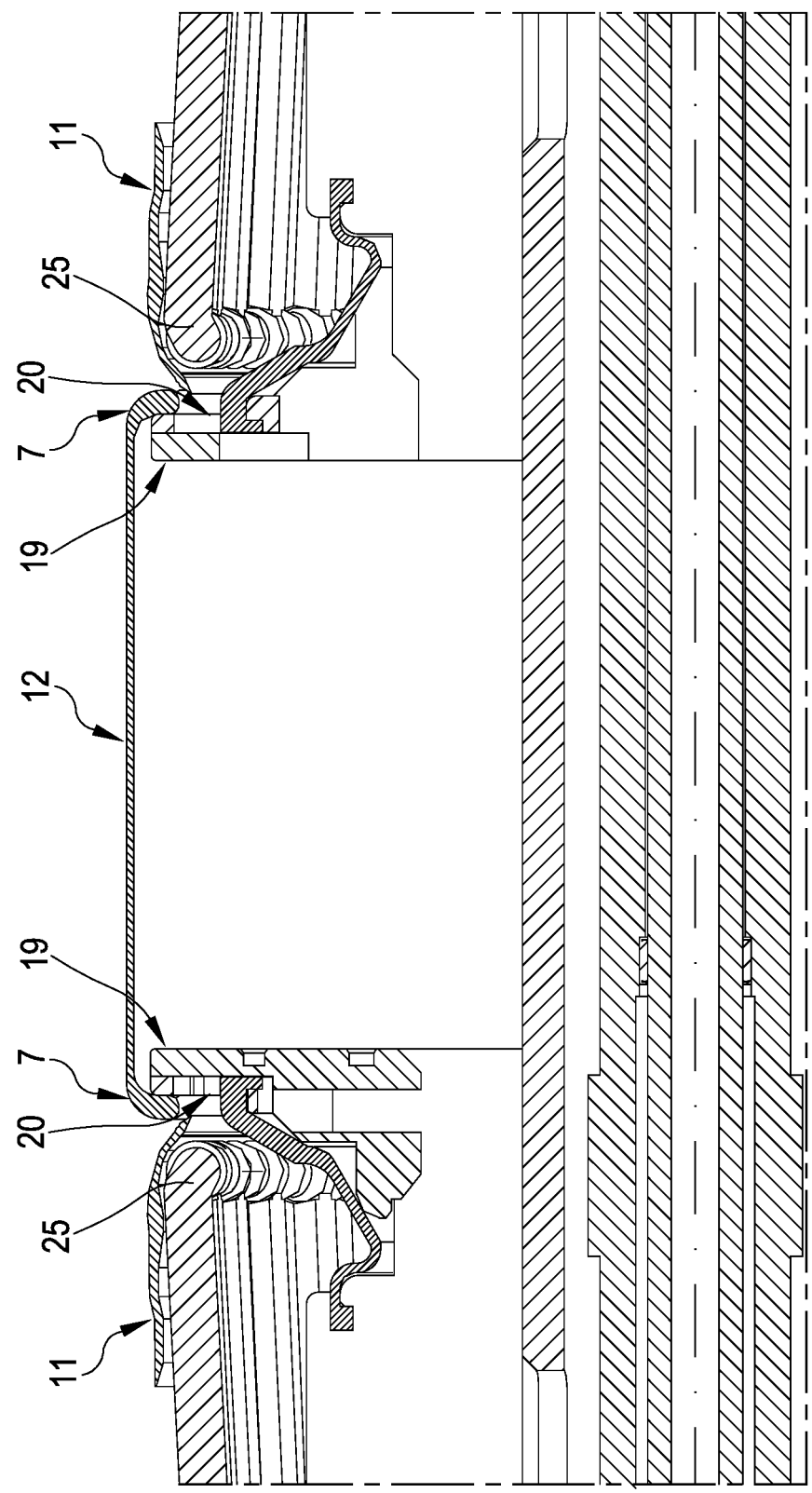
FIGS. 15 and 16 illustrate successive sequential steps in accordance with a variant of the process according to the present invention actuated with the apparatus of FIGS. 1, 2 and 4.
Figure 16:
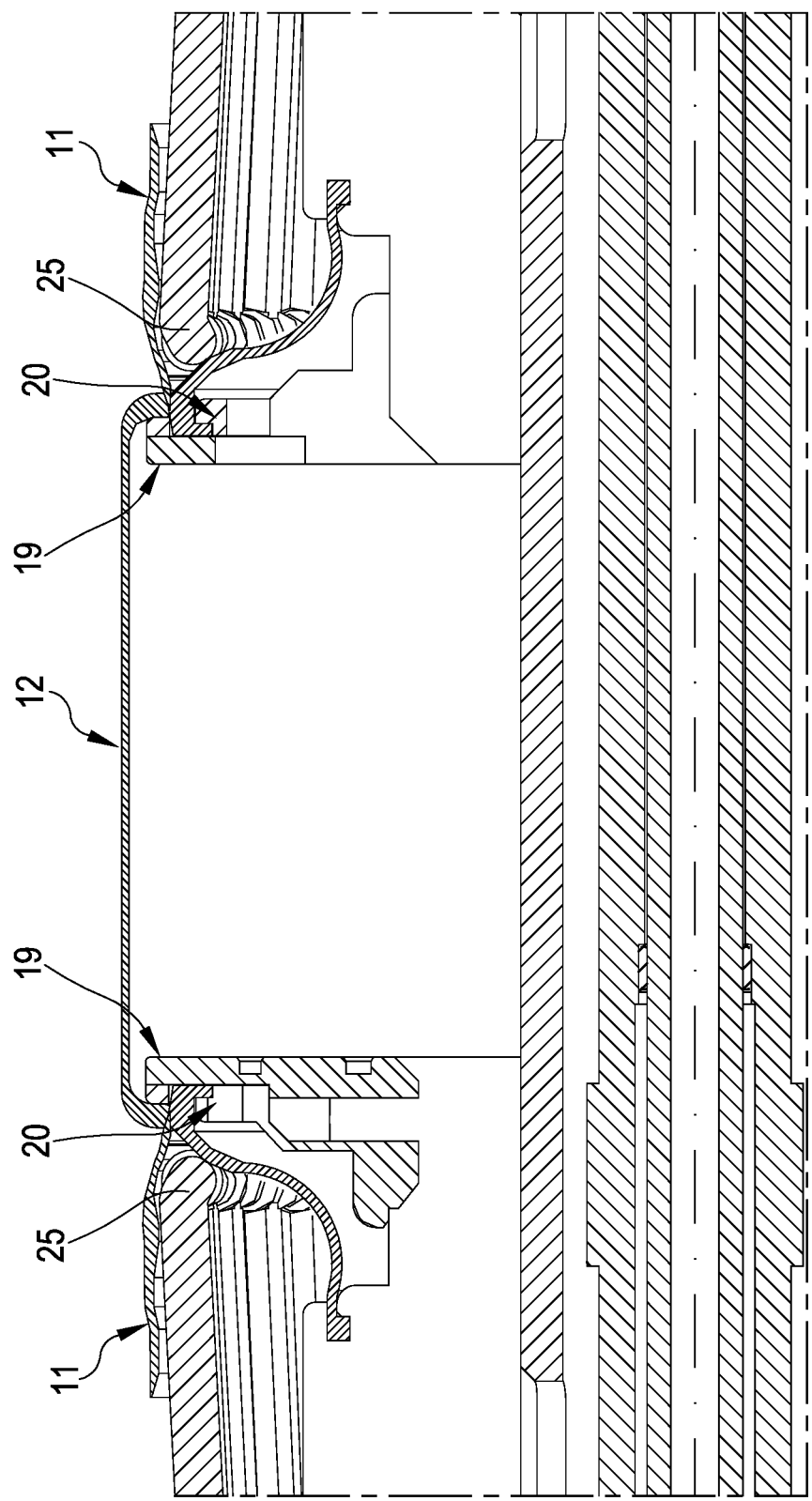

In one variant of the process, illustrated in FIGS. 15 and 16, prior to bringing the radially inner support elements 20 into the respective radially expanded configuration, i.e. starting from the configuration of FIG. 10 described above, the terminal end of each axial appendage 35 is axially approached to the carcass sleeve 12 until it is arranged between the respective bead 7 and the radially inner support elements 20 of the respective half-drum 17 (FIG. 15).

At this point, the radially inner support elements 20 are brought into the respective radially expanded configuration so as to mechanically lock the terminal end of each axial appendage 35 between the bead 7 and the radially inner support elements 20 (FIG. 16).

Once said terminal ends are locked, the support 18 and therefore the free ends 25 of the application levers 24 are axially moved away from the respective half-drum 17 and from the carcass sleeve 12 (configuration not illustrated in the figures). The sidewalls 11 remain anchored to the carcass sleeve 12 while the application levers 24 slide beneath them while continuing to support them.

Subsequently, the toroidal shaping of the carcass sleeve 12 is carried out as described above and, after such shaping, the application levers 24 are approached again to the carcass sleeve 12, being brought into the configuration of FIG. 13 (with the difference that the axial appendages 35 are mechanically locked) and the turn-up and the complete application of the sidewalls 11 are carried out, as in FIG. 14.

Figure 5A:
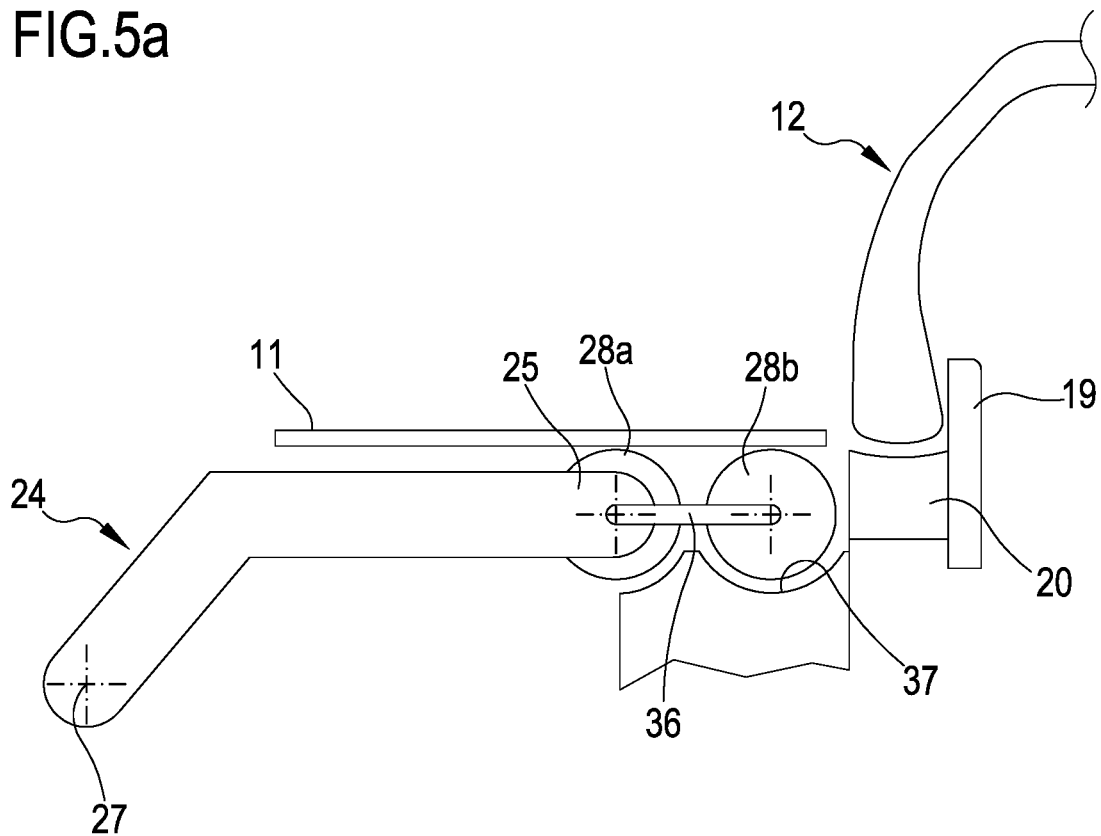
FIGS. 5A and 5B schematically illustrate, in successive instants of the process according to the invention, some parts of a variant of the element of FIGS. 2 and 4.
Figure 5B:
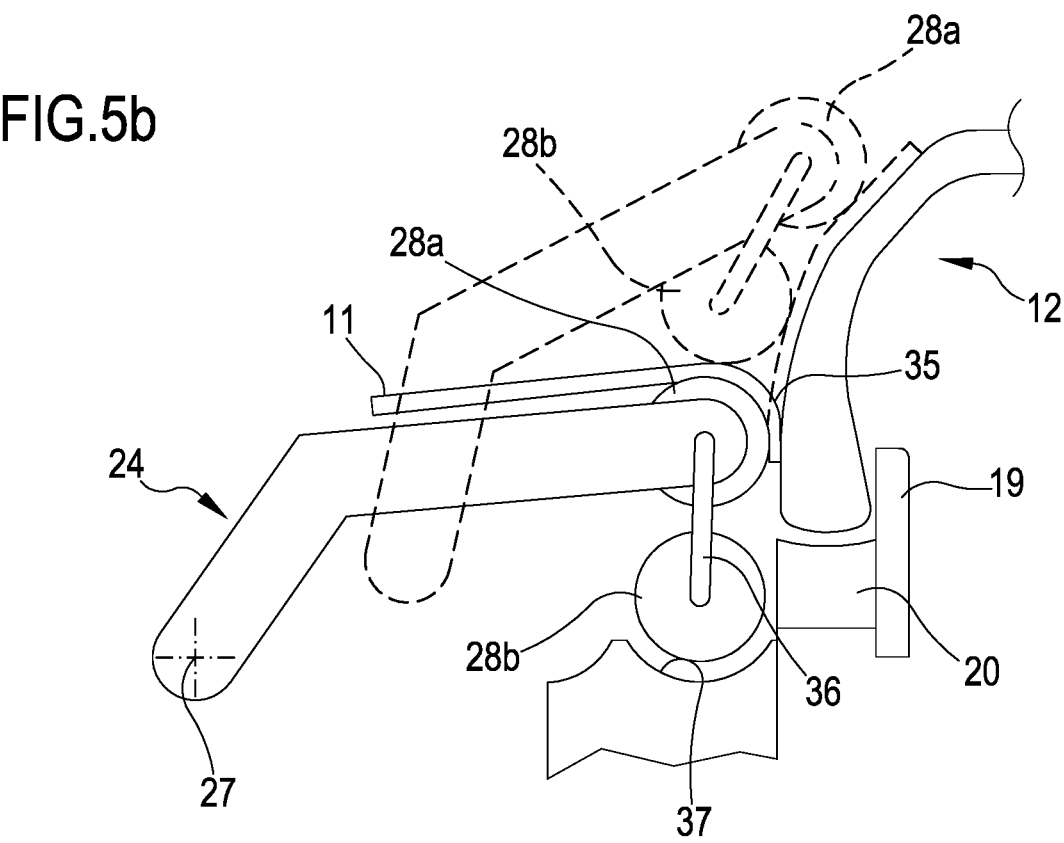

In an embodiment variant of the supports 18 of the apparatus 1 illustrated in FIGS. 5A and 5B, each of the free ends 25 of each application lever 24 carries a main application roller 28A (or a pair of side-by-side main application rollers) and at least one auxiliary application roller 28B (or a pair of side-by-side auxiliary application rollers). The auxiliary application roller 28B is articulated to the free end 25, preferably by means of a lever 36.

In the contracted configuration illustrated in FIG. 5A, the lever 36 and the auxiliary application roller 28B are aligned with the respective application lever 24. The auxiliary application roller 28B rests in a shaped seat 37 which is, for example, part of the support 18. In addition, in the contracted configuration, the axial appendage 35 extends beyond the main application rollers 28A and above the auxiliary application rollers 28B.

During the radial expansion of the application levers 24 and the approaching of the same to the carcass sleeve 12 up to the intermediate position, the auxiliary rollers 28B remain in their seats 37 while the main rollers 28A are brought into a radially outer position with respect to the auxiliary rollers 28B. The axial appendage 35 protrudes beyond the main rollers 28A, assuming the frustoconical shape directed towards the rotation axis "X" and is pressed against the carcass sleeve 12 by said main rollers 28A (FIG. 5B).

The further radial expansion of the application levers 24 (dashed line in FIG. 5B) allows turning up the sidewall and applying it against the side of the carcass sleeve 12. Also the auxiliary rollers 28B, driven by the levers 36, are radially opened and press the sidewall 11 against the carcass sleeve 12 after the pressing exerted by the main rollers 28A.

The invention claimed is:

1. A process for building tyres for vehicle wheels, comprising:
    arranging a carcass sleeve comprising at least one carcass ply and two beads on a shaping drum comprising two half-drums and two supports,
    wherein each of the beads is supported by one of the two half-drums,
    wherein each support is operatively associated with one of the half-drums and carries a plurality of application levers having free ends facing towards the respective half-drum;
    toroidally shaping the carcass sleeve supported by the two half-drums; and
    applying sidewalls on opposite sides of the carcass sleeve, wherein applying the sidewalls comprises:
        first arranging each sidewall as a ring around the application levers of the respective support, making an axial appendage of the sidewall protrude axially beyond the free ends of the respective application levers;
        then radially opening the free ends of the application levers of each support so as to make the respective sidewall radially expand, wherein the axial appendage remains radially more contracted with respect to a remaining portion of the sidewall and converges towards a rotation axis (X) of the shaping drum;
        then axially approaching the free ends of the application levers of each support and the axial appendage to the respective half-drum up to engage the axial appendage with the carcass sleeve; and
        then radially opening the free ends of the application levers of each support up to overturning the respective sidewall and making the respective sidewall adhere against a side of the carcass sleeve.

2. The process according to claim 1, wherein engaging the axial appendage with the carcass sleeve comprises: abutting and adhering a surface of the axial appendage of the sidewall facing towards the carcass sleeve against an axially outer annular zone of the carcass sleeve.

3. The process according to claim 2, wherein the step of engaging the axial appendages with the carcass sleeve is taken after the step of toroidally shaping the carcass sleeve.

4. The process according to claim 1, wherein engaging the axial appendage with the carcass sleeve comprises: arranging a terminal end of the axial appendage of the sidewall in a radially inner position with respect to the respective bead and locking the terminal end between the bead and radially inner support elements of the respective half-drum.

5. The process according to claim 4, wherein the step of engaging the axial appendages with the carcass sleeve is taken prior to the step of toroidally shaping the carcass sleeve.

6. The process according to claim 5, wherein, after locking the terminal end between the bead and the radially inner support elements and prior to the toroidal shaping of the carcass sleeve, the free ends of the application levers of each support are axially moved away from the respective half-drum.

7. The process according to claim 6, wherein, after the toroidal shaping of the carcass sleeve, the free ends of the application levers of each support are axially approached again to the respective half-drum and then further and radially opened.

8. The process according to claim 1, wherein the step of axially approaching the free ends of the application levers of each support to the respective half-drum is taken while the levers are fixed in a partially radially open position.

9. The process according to claim 1, wherein, at least when the application levers are radially open, the axial appendage is frustoconical.

10. The process according to claim 1, wherein arranging each sidewall as a ring around the application levers of the respective support comprises: dispensing and winding a section of sidewall around the application levers and mutually joining a head end to a tail end of the section in a respective junction area.

11. The process according to claim 10, wherein, before winding the section of sidewall, arranging at least one support plate in a radially outer position with respect to the free ends of the application levers at the respective junction area.

12. The process according to claim 11, wherein during the joining of the head end to the tail end, the at least one support plate extends axially beyond the free ends to support the axial appendage of the sidewall.

13. The process according to claim 12, wherein the at least one support plate is retracted prior to radially opening the free ends.

14. The process according to claim 1, wherein the carcass sleeve further comprises a pre-assembled carcass sleeve, and wherein arranging the carcass sleeve comprises axially inserting the shaping drum through the pre-assembled carcass sleeve and arranging the carcass sleeve around the two half-drums.

* * * * *